Nov. 10, 1931.   H. E. LAKE   1,830,949
LOCKING AND SEALING DEVICE FOR CONTAINER OPENINGS
Filed June 14, 1929   3 Sheets-Sheet 2
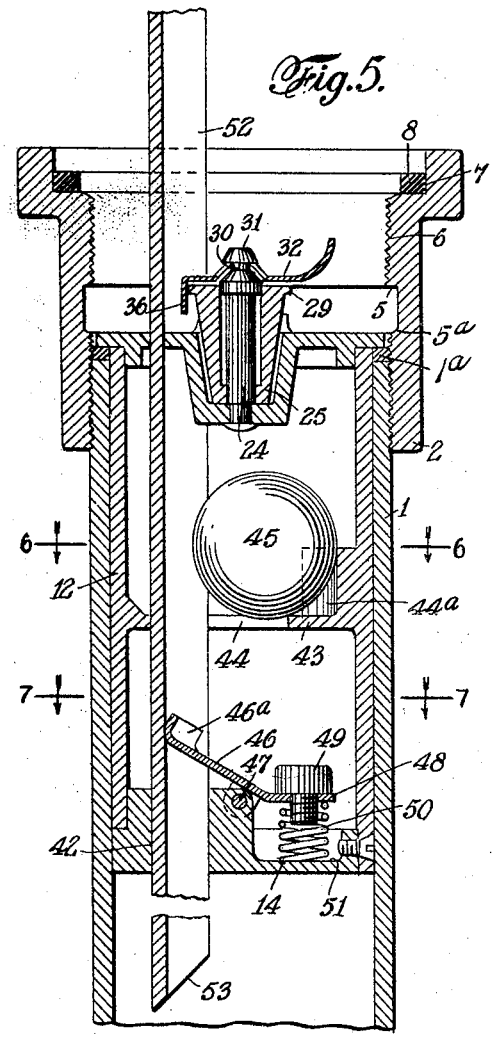
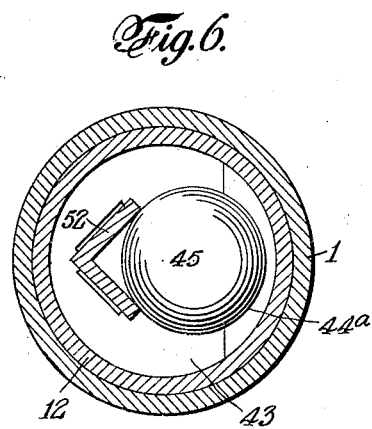
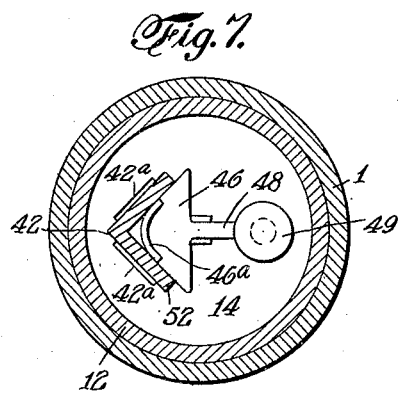
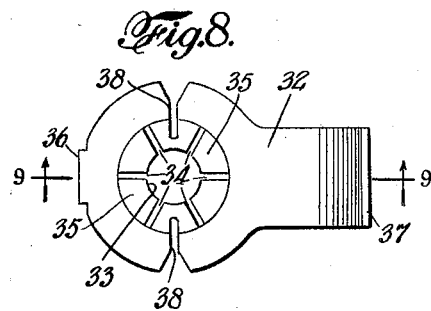
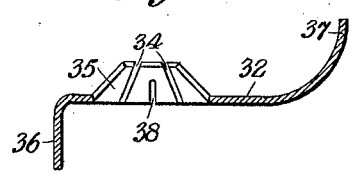

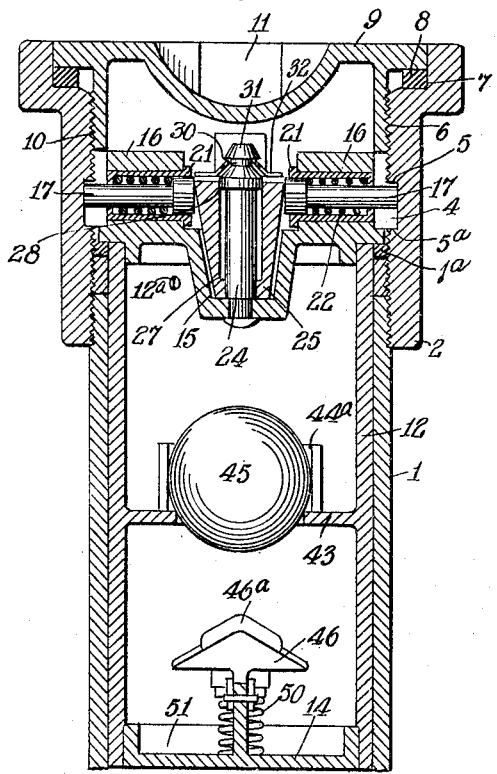

Nov. 10, 1931. H. E. LAKE 1,830,949
LOCKING AND SEALING DEVICE FOR CONTAINER OPENINGS
Filed June 14, 1929   3 Sheets-Sheet 3
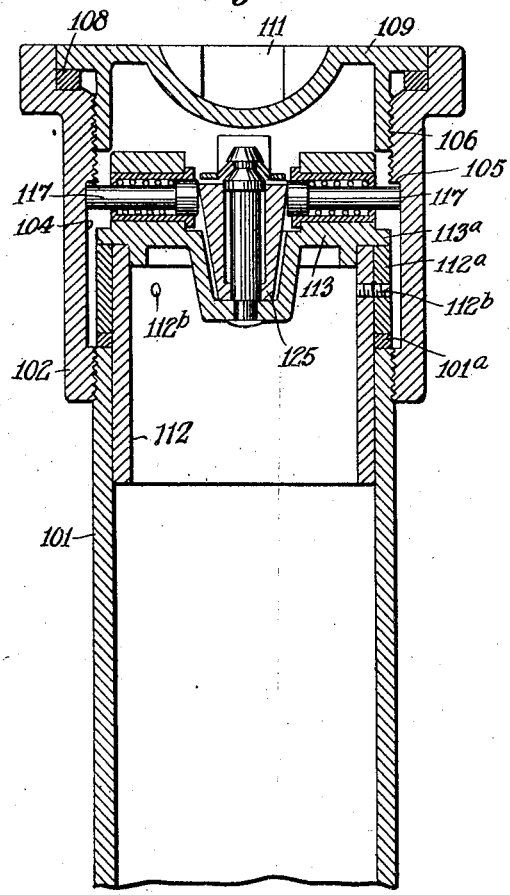
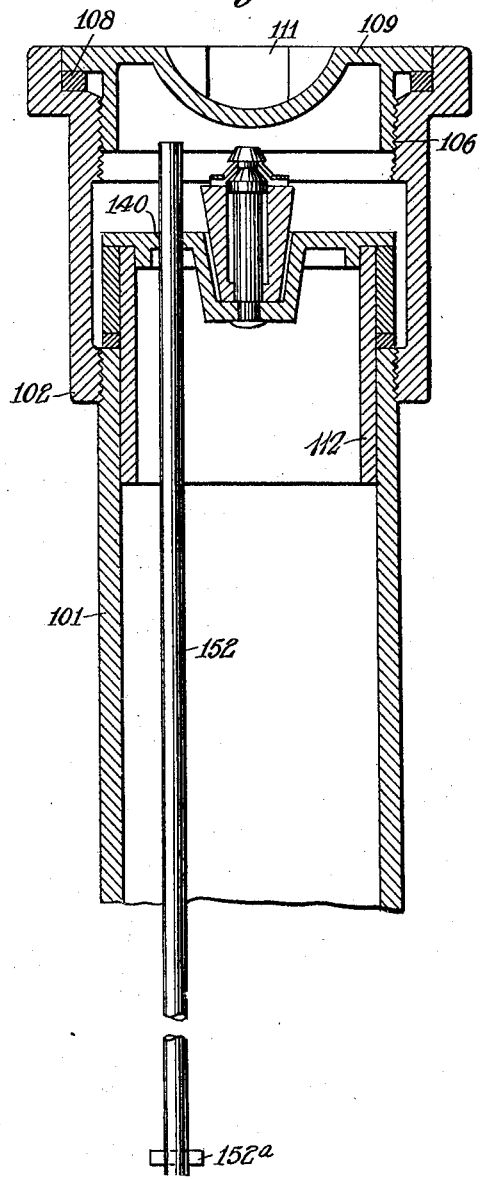
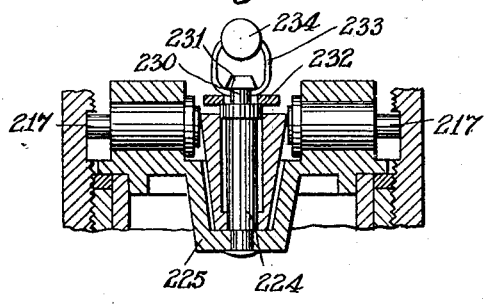
INVENTOR
Harry E. Lake
BY
ATTORNEY Patented Nov. 10, 1931

1,830,949

UNITED STATES PATENT OFFICE

HARRY E. LAKE, OF NEW YORK, N. Y., ASSIGNOR TO PREFERRED UTILITIES MANUFACTURING CORPORATION, OF NEW YORK, N. Y., A CORPORATION OF DELAWARE

LOCKING AND SEALING DEVICE FOR CONTAINER OPENINGS

Application filed June 14, 1929. Serial No. 370,732.

My invention consists in the novel features hereinafter described, reference being had to the accompanying drawings which show several embodiments of the same selected by me for purposes of illustration, and the said invention is fully disclosed in the following description and claims.

The object of my invention is to provide a simple and efficient means for locking a container opening, to prevent tampering therewith by unauthorized persons without leaving evidence thereof. My invention is particularly applicable for locking and sealing the filling aperture or pipe of gasoline or fuel oil containers, or the like, located at filling stations for supplying automotive vehicles, for the prevention of substitution or adulteration of the liquid dispensed, although it may be used for other purposes. My invention also provides for ascertaining the quantity of liquid in the container at any time, by the use of a gauge stick, without interfering with the locking and sealing device, and in the preferred form of my invention, without the necessity of allowing the gauge stick to remain in the container in contact with the liquid.

In the accompanying drawings which illustrate several embodiments of my invention selected by me for purposes of illustration, Fig. 1 represents a sectional view of a filling pipe for gasoline tanks provided with the preferred form of my locking and sealing device, in locking and sealing position therein.

Fig. 2 is a top plan view of the same with the cover of the filling pipe removed.

Fig. 3 is a view similar to Fig. 1 showing the locking and sealing device in released position preparatory to removal from the filling pipe.

Fig. 4 is a view partly in section and partly in elevation of the locking and sealing device detached, and rotated 90 degrees from the position shown in Figs. 1, 2 and 3.

Fig. 5 is a sectional view of the filling pipe with the locking and sealing device in operative relation therewith, taken on line 5—5 of Fig. 2, and illustrating the manner of inserting and removing the gauge stick.

Fig. 6 is a horizontal section on line 6—6 of Fig. 5.

Fig. 7 is a horizontal section on line 7—7 of Fig. 5.

Fig. 8 is a top plan view of a frangible seal which may be conveniently employed for sealing and locking devices.

Fig. 9 is a sectional view of the seal on line 9—9 of Fig. 8.

Fig. 10 is a vertical sectional view of a filling pipe showing a modification of my invention.

Fig. 11 is a vertical sectional view of the same taken in a plane at an angle of 90 degrees from the plane of section in Fig. 10.

Fig. 12 is a detail view illustrating a different form of sealing means for the locking device.

In the form of my invention illustrated in Figs. 1 to 9 inclusive, 1 represents the filling pipe to be protected, as for example the filling pipe for a gasoline tank, and 2 represents the usual flush box or terminal box screwed on the upper end of the pipe in the usual manner and permanently locked to the pipe in any usual or preferred manner, so as to prevent its removal therefrom. The flush box is provided interiorly with an annular recess, 4, forming shoulders, 5, 5, at its upper and lower ends, and the upper part of the box is provided with the interior screw threads, 6, and with an annular recess, 7, to receive a packing ring, 8. 9 represents the usual cap or closure for the flush box, having a threaded portion, 10, for engaging the threaded portion, 6, of the box, and provided with a flush top of greater diameter than the threaded portion to engage the packing ring, 8, and seal the pipe against dust and moisture. The closure, 9, is also conveniently provided with the usual key recess, indicated at 11, to facilitate its removal and replacement.

The preferred form of my locking and sealing device illustrated in these figures comprises a cylindrical body or plug, 12, which is closed at its upper end by a horizontal plate, 13, and at its lower end by a bottom plate, 14. The upper plate is provided with a central recess, 15, on two opposite sides of which are bosses, indicated at 16, 16, which are bored coaxially to each receive a sliding locking pin or bolt, 17, for convenience of assembly. Each of the bolts, 17, is provided with an enlarged head, 18, inserted in a guiding sleeve, 19, having its internal diameter fitting the enlarged head, 18, and its external diameter fitting the bore of the boss, 16, the outer end of said sleeve being provided with an inwardly extending annular flange, 20, forming an aperture to fit the portion of the bolt, 17, of smaller diameter, the inner end of the sleeve being provided with an outwardly extending annular flange or projection, 21, to engage the inner face of the boss. The coil spring, 22, is inserted in the sleeve, surrounding the portion of the bolt of smaller diameter between the head, 18, and the flange, 20. The bolt, spring and sleeve are assembled and then inserted in the boss, 16. The distance between the bosses, 16, 16, is slightly greater than the length of the sleeve, and each of the bosses is cut away, as indicated at 23, to form a recess at one side of the same, of a diameter equal to that of the smaller portion of the bolt, so that the portion of the bolt which projects beyond the outer edge of the sleeve can be passed through this recess to facilitate the insertion of the sleeves, 19, in the bosses. The bottom of the recess, 15, is provided with a vertical stem, 24, riveted or otherwise secured thereto, and extending upwardly between the bosses, 16, and carrying a vertically movable tapering wedge member, 25, constructed to engage the inner faces of the enlarged portions, 18, of the bolts, 17. This wedge, 25, is provided with a vertical, enlarged bore, 26, which is of greater diameter than the stem, 24, and terminates at the bottom in an aperture of smaller diameter, having a guiding engagement on said stem, thus forming an annular shoulder, indicated at 27. The stem, 24, is provided adjacent to its upper end with an enlarged portion, having a guiding engagement in said bore and forming a shoulder, 28, to engage the shoulder, 27, and act as a stop to limit the upward movement of the wedge, as indicated in Fig. 3. The wedge member, 25, is provided at its upper end with lateral exterior projections, 29, see Fig. 5, to facilitate lifting the wedge with the finger and thumb. Above the shoulder, 28, of the stem, the latter is provided with means for engaging a seal so that the wedge member cannot be raised from its lowest position with respect to the stem, 24, without leaving evidence of such operation. In this instance I have shown the upper end of the stem above the shoulder, 28, provided with a neck, 30, of reduced diameter, above which is a tapering or conical locking head, 31, constructed to be engaged by a frangible seal, indicated as a whole at 32, and illustrated in detail in Figs. 8 and 9. This seal is composed of a thin brittle plate of suitable material, provided with an aperture, 33, of slightly less diameter than that of the locking head, 31, from which radial slits, 34, extend to form lips, 35, which are struck up into inclined position, as indicated in Fig. 9, so that they may be pressed over the locking head, 31, and will engage the under surface of the same, surrounding the neck, 30, of the stem, 24. For convenience, the seal is preferably provided with a downwardly extending portion, 36, at one end and with an upturned hand engaging portion, 37, at the other. The seal is also preferably weakened by means of slots, 38, extending inwardly from opposite sides and into two of the oppositely disposed lips, 35, as shown in Figs. 8 and 9. This seal is preferably formed of very thin tempered metal, as steel for example, and it is therefore very brittle, so that while the lips, 35, will have sufficient resilience to enable the seal to be slipped over the locking head, 31, to seal the locking device, any attempt to disengage the lips, 35, to permit the removal of the seal will break the lips or some of them, or break the seal across the line of the slots, 38, and show that the seal has been tampered with. I also prefer to plate the seal with nickel or other suitable plating, which would be destroyed or injured by any attempt to withdraw the temper from the seal by heating, which affords further protection against tampering with the seal.

It is desirable from time to time to insert a gauge stick into the tank to determine the liquid level therein, where no other means is provided for indicating the liquid level. It is desirable that this gauge stick should not be left in the tank subject continuously to the action of the liquid therein. I, therefore, provide in the preferred form of my invention means for permitting the gauge stick to be inserted and passed through the locking device while it is locked and sealed in the filling pipe, while at the same time providing means for preventing any liquid from being introduced into the filling pipe when locked and sealed through the apertures provided for the gauge stick. In this instance I have shown the top plate, 13, of the body of the locking device provided with an angular slot, indicated at 40, the walls of the slot being provided on at least one side, as shown, with recessed portions, indicated at 40ª, which increase the width of the slots, except at the ends and at the junction of the angular portions of the slot. The bottom plate, 14, of the body of the locking device is provided with a similarly shaped slot, indicated at 42, having the recesses, 42ª, said slot being in registration with the slot, 40. Between the upper and lower plates of the main body, I provide a horizontal transverse partition, indicated at 43, having an aperture, 44, therein, to receive a ball valve, indicated at 45, and at one side of this aperture the partition is provided with a curved recess, indicated at 44ª, see Figs. 4 and 6, to permit the ball to be moved a limited distance off of its seat.

The bottom plate, 14, is provided with a pivoted closure plate, indicated at 46, pivoted at 47, and being of substantially triangular shape, so that when it is in horizontal position it will close the slot, 42. This plate, 46, is provided at its outer end with a curved upwardly extending flange, 46ª. Said plate, 46, is also provided with an arm, 48, extending on the opposite side of its pivot and provided with a counterbalance weight, 49, adapted to hold the plate normally in an inclined position, as shown for example in Figs. 4 and 5. Said arm is also provided with a stop, in this instance a very light spring, indicated at 50, secured to the underside of the arm, 48, and resting on the bottom of a recess, 51, in the bottom plate, 14. The closing device, 46, is thus held very delicately balanced, so that if the ball valve, 45, were tilted off of its seat upon the edges of the aperture, 43, by inserting a wire, for example through the upper slot, 40, and it was attempted to pour liquid through said slot, 40, the liquid would fall upon the outer end of the plate, 46, and tilt it down into position to close the slot, 42, and hold it in closed position, so as to prevent any liquid from passing into the container to be protected.

In connection with this device I employ a gauge stick, indicated at 52, which is of angular shape in cross-section, as shown, and of a size to fit the reduced portions of the registering slots, 40 and 42. The lower end of the gauge stick is also preferably beveled, as indicated at 53. The gauge stick is preferably formed of brass or other suitable metal, and may be colored by painting, oxidizing, or otherwise, preferably black, and may, if desired, be provided with indications which will show the depth to which it is inserted in the liquid in the container.

The body, 12, of the locking device is made of the correct size to fit within the filling pipe, 1, and the upper plate, 13, is provided with an annular shoulder, 13a, projecting laterally beyond the body portion. To insert the locking device in the filling pipe, the wedge member, 25, is raised to its highest position so as to permit the withdrawal of the locking bolts, 17, by their springs, 22, and the device is then lowered into the filling pipe, and a packing washer, indicated at 1ª, is preferably placed within the flush box in engagement with the upper end of the threaded portion of the filling pipe. The locking device is lowered into the filling pipe through the flush box until the annular shoulder, 13ª, engages the packing ring, 1ª, so that the device is supported in such position that the locking bolts will be just below the shoulders, 5, of the flush box, as shown in Fig. 3. The wedge member is then pushed downwardly into the recess, 15, thereby moving the locking bolts outwardly so as to bring the outer ends of the portions, 17, thereof beneath the shoulders, 5, and lock the device against removal. The seal, 32, is then pressed over the locking head, 31, of the stem, 24, as shown in Figs. 1, 2 and 5, and the filling pipe is effectively locked and sealed against any possibility of tampering with it by unauthorized persons, or the introduction of any liquid into the container through the filling pipe without breaking the seal. The cap or cover, 9, is then screwed into the flush box to protect the device from dust and moisture.

If it is desired to gauge the liquid in the container, the cover, 9, is removed and the gauge stick, 52, is inserted in the angular slot, 40, far enough to engage the ball valve, 45, and move it laterally off of its seat and into engagement with the recess, 44ª. When the ball is in the recess, it will engage the angularly disposed portions of the gauge stick, 52, in the manner indicated in Fig. 6 and act as a positioning guide for the stick, so that as the gauge stick is pushed downwardly, its lower end will be guided past the pivoted closing plate, 46, as shown in Fig. 7, without tripping the latter, and into engagement with the lower slot, 42. The gauge stick can then be pushed down until it engages the bottom of the tank, and withdrawn when the upper edge of the wetted portion of the gauge stick will show the liquid level in the tank and indicate the amount of contents thereof. It will be noted that the function of the recesses, 40ª and 42ª, in the slots, 40 and 42, is to prevent wiping off the liquid from the outer face of the gauge as it is withdrawn, so that the wetted portions can be readily seen. It will thus be seen that the tank can be gauged at any time by the use of the gauge stick, without in any way interfering with the locked and sealed condition of the filling pipe. As before stated, the seal cannot be removed without breaking it, and the wedge member cannot be raised to release the locking bolts without breaking the seal, and as previously stated, no liquid can be introduced into the tank through the slots provided for the gauge stick.

When an authorized person desires to fill the container, he will break seal, 32, by pulling upward on the handle portion, 37, and remove the pieces. The angular portion, 36, will remain attached to a portion of the seal and will prevent said portion from accidentally slipping through the slot, 40, for the gauge stick. The wedge member will then be raised to release the locking bolts, and the entire locking device can then be removed by lifting upward on the wedge member after the shoulders, 27 and 28, are brought into contact, as shown in Fig. 3. The container is then filled, the locking device is replaced and relocked by depressing the wedge member, 25, and sealed with a fresh seal.

Where the tank is provided with other means for gauging the depth of liquid, obviating the necessity of using a gauge stick at all, or where the gauge stick is to be left in the tank at all times when it is not in use and is provided with means for preventing its removal from engagement with the locking device, it is unnecessary to provide the locking device with the ball valve and closing plate previously described, and the construction of the locking and sealing device may be considerably simplified as illustrated for example in Figs. 10 and 11, in which parts corresponding to those shown in Figs. 1 to 9 inclusive are given the same numerals with the addition of 100. In these figures, I have shown the filling pipe, 101, provided with a flush box or terminal box, 102, which in this instance may be taken to represent one of the many forms of terminal boxes now in use, in which the vertical height of the annular recess, 104, may vary considerably, and in Figs. 10 and 11 is shown of considerably greater height than in the preceding figures. In this instance the body, 112, of the locking device is a simple cylindrical shell which may be open at the bottom, and is provided with the top plate, 113, having the projecting flange, 113ª, and carrying the locking and sealing means, constructed and operating exactly as previously described. As it is desirable that the locking bolts, indicated at 117, 117, should engage as closely as possible the upper shoulders, 105, of the flush box, where the recess, 104, is of greater height than the distance between the top plate, 113, and the top surface of the bolts, I provide an annular spacing collar, indicated at 112ª, surrounding the body, 112, immediately below the flange, 113ª, and preferably riveted thereto, as indicated at 112ᵇ, or otherwise permanently secured to the body, 112, the said spacing collar being of sufficient vertical height to engage the packing ring, 101ª, (or the upper edge of the pipe, 101), and support the locking device in such position that the bolts, when projected by the wedge member, 125, will project into the recess, 104, immediately below the shoulder, 105, as shown in Figs. 10 and 11. It will be understood that these spacing collars will be furnished with any form of my locking and sealing device, and may be made of different lengths so as to accommodate them to the different vertical heights of the recessed portions of flush boxes or terminal boxes now in use. Such a spacing sleeve can be applied to the form of locking device shown in Figs. 1 to 9 inclusive if desired, and I have shown the body, 12, of that device provided with a rivet hole, 12ª, for the attachment of such a spacing sleeve or collar where that may be necessary. If it is not desired to use a gauge stick at all for determining the depth of the liquid in the tank after the locking device is locked and sealed, the top plate, 113, may be impervious, but where it is desired to use the gauge stick with this simplified form of the device, as for example in Fig. 11, I provide the top plate, 113, with a slot, 140, to receive a gauge stick, 152, which may be either round, as indicated in Fig. 11, or of any other cross-section, and which is of such length that when it rests on the bottom of the tank, the upper end will be within the flush box and project far enough above the plate, 113, to permit it to be grasped, but not far enough to interfere with screwing in the flush closure or cap, 109. In this instance, however, for the purpose of preventing liquid from being improperly introduced into the tank through the filling pipe, the gauge stick, 152, will be provided with means for preventing it from being withdrawn entirely from the slot, 140. In this instance the gauge stick, 152, is shown provided adjacent to its lower end with a stop pin or enlargement, 152ª, for this purpose. With this simplified form of the locking and sealing device, the tank can be filled and the filling pipe locked and sealed in the manner previously described, and no unauthorized person can remove the locking device without breaking the seal, or introduce liquid into the tank, and where the slot, 140, is provided, the gauge stick may be employed at any time for ascertaining the depth of the liquid in the tank or container, by simply removing the cap, 109, and using the gauge stick, which is returned to the position indicated in Fig. 11, and the cap replaced.

I do not limit myself to the particular sealing means herein previously described and illustrated in the drawings, Figs. 1 to 11, as other forms of sealing means may be employed in connection with the locking mechanism of the locking device. For example in Fig. 12, in which the parts corresponding to those shown in Figs. 1 to 9 inclusive are given the same reference numerals with the addition of 200, I have shown the upper end of the locking stem, 224, provided with an aperture, in the neck portion, 230, below the head, 231, to receive a sealing wire, and the upper end of the stem is provided with a sealing washer, 232, having a central aperture of just sufficient diameter to enable it to be slipped over the sealing head, 230, after which a sealing wire, 233, is passed through the aperture, in the neck, 230, and sealed with the usual lead seal, 234, in a well known way, so that the locking device cannot be tampered with by unauthorized persons, without breaking the wire, 233, or the seal, 234. This is merely illustrative of one of a number of methods which may be employed to seal the locking device so that the wedge member cannot be raised by unauthorized persons, leaving evidence of tampering.

It will be readily understood that by the use of my locking and sealing devices shown and described, distributors having a well known product, like gasoline for example, can supply their retail dealers from time to time with the liquid, by introducing it into the storage tank of the retailer through the filling pipe in the usual manner, after which the filling pipe can be locked and sealed in the manner described. The identical liquid can then be dispensed through the pump usually employed for that purpose in the ordinary manner, thus insuring the protection of the public and the reputation of the distributor or the product, and any attempt at adulteration, dilution, or substitution of the liquid product, by unauthorized persons, will be detected.

What I claim and desire to secure by Letters Patent is:—

1. In a device of the kind described, the combination with a main body for closing the opening to be protected, a plurality of horizontal projecting locking bolts carried by said main body, and a vertically movable wedge member for projecting said bolts.

2. In a device of the kind described the combination with a main body for closing the opening to be protected, a plurality of horizontal projecting locking bolts carried by said main body, and a vertically movable wedge member for projecting said bolts, and frangible sealing means for said wedge member.

3. In a device of the kind described, the combination with a main body for closing the opening to be protected, a plurality of horizontal projecting locking bolts carried by said main body, retracting means for said bolts, a vertical stem secured to said main body and projecting above the same, and a vertically movable wedge member having a guiding engagement with said stem for engaging and projecting said bolts.

4. In a device of the kind described, the combination with a main body for closing the opening to be protected, a plurality of horizontal projecting locking bolts carried by said main body, retracting means for said bolts, a vertical stem secured to said main body and projecting above the same, and a vertically movable wedge member having a guiding engagement with said stem for engaging and projecting said bolts, said stem having a portion extending above the wedge member when in locking position, a frangible sealing means for engaging the upwardly extending portion of said stem, and means for limiting the relative movement of said locking member with respect to said stem.

5. In a device of the kind described, the combination with a main body for closing the opening to be protected, a centrally located vertically disposed stem connected with said main body, horizontally apertured portions of said main body disposed radially with respect to said stem, horizontally disposed locking bolts carried by said apertured portions of the main body, retracting springs for said bolts, and a vertically movable wedging member having a guiding engagement with said stem and provided with inclined portions for engaging and projecting said bolts.

6. In a device of the kind described, the combination with a main body for closing the opening to be protected, a plurality of horizontal projecting locking bolts carried by said main body, a vertically disposed centrally located stem secured to said main body, a vertically movable wedge member having a guiding engagement with said stem for engaging and projecting said bolts, said stem having an enlarged locking head extending above the locking member when in locking position, and a frangible seal, comprising a frangible plate provided with an aperture for engaging said locking head, and a plurality of inclined lips surrounding said aperture adapted to be sprung over said head into locking engagement therewith.

7. In a device of the kind described, the combination with a main body for closing the opening to be protected, a plurality of horizontal projecting locking bolts carried by said main body, a vertically disposed centrally located stem secured to said main body, a vertically movable wedge member having a guiding engagement with said stem for engaging and projecting said bolts, said stem having an enlarged locking head extending above the locking member when in locking position, and a frangible seal comprising a frangible plate provided with an aperture for engaging said locking head, and a plurality of inclined lips surrounding said aperture adapted to be sprung over said head into locking engagement therewith, said seal being formed of thin tempered metal.

8. In a device of the kind described, the combination with a main body for closing the opening to be protected, a plurality of horizontal projecting locking bolts carried by said main body, a vertically disposed centrally located stem secured to said main body, a vertically movable wedge member having a guiding engagement with said stem for engaging and projecting said bolts, said stem having an enlarged locking head extending above the locking member when in locking position, and a frangible seal comprising a frangible plate provided with an aperture for engaging said locking head, and a plurality of inclined lips surrounding said aperture adapted to be sprung over said head into locking engagement therewith, said seal being formed of thin tempered metal.

9. In a device of the kind described, the combination with a main body for closing the opening to be protected, a plurality of horizontal projecting locking bolts carried by said main body, a vertically disposed centrally located stem secured to said main body, a vertically movable wedge member having a guiding engagement with said stem for engaging and projecting said bolts, said stem having an enlarged locking head extending above the locking member when in locking position, and a frangible seal comprising a frangible plate provided with an aperture for engaging said locking head, and a plurality of inclined lips surrounding said aperture adapted to be sprung over said head into locking engagement therewith, said seal being composed of thin tempered metal provided on opposite sides with weakening slots extending into the adjacent lips, one end of said seal being provided with an upturned hand engaging portion on one side of said weakening slot, and the opposite end of said seal being provided with a downwardly extending angular portion.

10. The combination with a filling pipe and a terminal box secured thereto and provided with an interior annular recessed portion forming a shoulder at its upper end, of a locking device for said filling pipe, comprising a cylindrical main body having a closing plate at its upper end provided with an outwardly projecting supporting flange for supporting said main body on the upper edge of said filling pipe, said closing plate being provided with horizontal projecting locking bolts for engaging the annular recess in said terminal box, retracting springs for said bolts, a vertically movable wedge member having a limited movement with respect to said closing plate for engaging and projecting said bolts and sealing means for said wedge member when in locking position.

11. The combination with a filling pipe and a terminal box secured thereto and provided with an interior annular recessed portion forming a shoulder at its upper end, of a locking device for said filling pipe, comprising a cylindrical main body having a closing plate at its upper end provided with an outwardly projecting supporting flange for supporting said main body on the upper edge of said filling pipe, said closing plate being provided with horizontal projecting locking bolts for engaging the annular recess in said terminal box, retracting springs for said bolts, a vertically movable wedge member having a limited movement with respect to said closing plate for engaging and projecting said bolts and sealing means for said wedge member when in locking position, and a spacing sleeve secured to said main body below the supporting flange thereof, for supporting said main body with the locking bolts in operative relation with said shoulders of said terminal box.

12. The combination with a filling pipe and a terminal box secured thereto and provided with an interior annular recessed portion forming a shoulder at its upper end, of a locking device for said filling pipe, comprising a cylindrical main body having a closing plate at its upper end provided with an outwardly projecting supporting flange for supporting said main body on the upper edge of said filling pipe, said closing plate being provided with horizontal projecting locking bolts for engaging the annular recess in said terminal box, retracting springs for said bolts, a vertically movable wedge member having a limited movement with respect to said closing plate for engaging and projecting said bolts and sealing means for said wedge member when in locking position, said closing plate being provided with a slot for the reception of a gauge stick.

13. In a device of the kind described, the combination with a hollow cylindrical main body provided with a closing plate at the top and at the bottom of the same, having connected angular slots therein for the reception of a gauge stick angular in cross-section, said main body being provided interiorly with a horizontal partition having an aperture therein, a ball valve seated in said aperture, said main body being provided at its upper end with a plurality of horizontal projecting locking bolts, a vertically movable wedge member for projecting said bolts, and means for sealing said wedge member in locking position.

14. In a device of the kind described, the combination with a hollow cylindrical main body provided with a closing plate at the top and at the bottom of the same, having connected angular slots therein for the reception of a gauge stick angular in cross-section, said main body being provided interiorly with a horizontal partition having an aperture therein, a ball valve seated in said aperture, said main body being provided at its upper end with a plurality of horizontal projecting locking bolts, a vertically movable wedge member for projecting said bolts, and means for sealing said wedge member in locking position, a pivotally mounted closing plate for closing the slot in the closing plate at the lower end of said main body, and provided with counterbalancing means for holding it in open position and out of the path of the gauge stick.

15. In a device of the kind described, the combination with a hollow cylindrical main body provided with a closing plate at the top and at the bottom of the same, having connected angular slots therein for the reception of a gauge stick angular in cross-section, said main body being provided interiorly with a horizontal partition having an aperture therein, a ball valve seated in said aperture, said main body being provided at its upper end with a plurality of horizontal projecting locking bolts, a vertically movable wedge member for projecting said bolts, and means for sealing said wedge member in locking position, a pivotally mounted closing device for closing the slot in the closing plate at the lower end of said main body, and provided with counterbalancing means for holding it in open position and out of the path of the gauge rod, said partition of the main body being provided with a recess for holding said ball when in unseated position, in position to engage the angular gauge stick, and hold it in alignment with the slot in the closing plate at the lower end of said main body.

16. In a device of the kind described, the combination with a hollow cylindrical main body provided with a closing plate at the top and at the bottom of the same, having connected angular slots therein for the reception of a gauge stick angular in cross-section, said main body being provided interiorly with a horizontal partition having an aperture therein, a ball valve seated in said aperture, said main body being provided at its upper end with a plurality of horizontal projecting locking bolts, a vertically movable wedge member for projecting said bolts, and means for sealing said wedge member in locking position, said angular slots in the closing plates having their main portions of greater width than the portions at their ends and at the junction of the angularly disposed portions of said slots, to prevent the removal of liquid from the gauge stick.

17. The combination with a filling pipe and a terminal box secured thereto and provided with an interior annular recess, of a locking and sealing device comprising a hollow main body adapted to removably fit said filling pipe, and having its upper and lower ends provided with closing plates having connected angular gauge slots therein, said main body being provided with a horizontal partition having an aperture therein and a ball valve seated in said aperture, the upper closing plate being provided with a centrally located recess, a vertical stem secured to the bottom thereof and projecting above the said plate, horizontally disposed locking bolts disposed radially with respect to said stem, a vertically movable wedge member having a guiding engagement with and a limited movement with respect to said stem, and provided with inclined portions for engaging and projecting said bolts, said stem extending above said wedge member when in locking position and being provided with means for engaging a frangible seal, the lower plate of said main body being provided with a pivoted counter-balanced closing device normally held out of alignment with said connected slots and adapted to close the slot in said lower plate.

18. The combination with a filling pipe and a terminal box secured thereto and provided with an interior annular recess, of a locking and sealing device comprising a hollow main body adapted to removably fit said filling pipe, and having its upper and lower ends provided with closing plates having connected angular gauge slots therein, said main body being provided with a horizontal partition having an aperture therein and a ball valve seated in said aperture, the upper closing plate being provided with a centrally located recess, a vertical stem secured to the bottom thereof and projecting above the said plate, horizontally disposed locking bolts disposed radially with respect to said stem, a vertically movable wedge member having a guiding engagement with and a limited movement with respect to said stem, and provided with inclined portions for engaging and projecting said bolts, said stem extending above said wedge member when in locking position and being provided with means for engaging a frangible seal, the lower plate of said main body being provided with a pivoted counter-balanced closing device normally held out of alignment with said aligned slots and adapted to close the slot in said lower plate, a removable gauge stick angular in cross-section for engaging said connected slots, said partition of the main body being provided with a recess for engaging the ball valve when unseated, and holding it in position to engage angularly disposed portions of the gauge stick and guide it into engagement with the slot in the plate at the lower end of said main body.

19. In a device of the kind described, the combination with a main body for closing the opening to be protected, provided with a vertically disposed stem secured thereto, and lugs provided with horizontal apertures having their axes disposed radially with respect to said stem, a sleeve engaging each of said lug apertures, provided with a retaining flange at its inner end and having a bolt aperture at its outer end, a locking bolt engaging each of said sleeves and having a locking portion of reduced diameter extending through said bolt aperture, and a spring in each of said sleeves surrounding the reduced portion of the bolt, and a vertically movable wedge member having a guiding engagement with said stem and a limited vertical movement with respect thereto, and having inclined portions for engaging and projecting said bolts, said stem having a portion extending above said wedge member when in locking position, and provided with means for engaging a frangible seal.

In testimony whereof I affix my signature.

HARRY E. LAKE.